United States Patent [19]
Laurent et al.

[11] 3,894,063
[45] July 8, 1975

[54] SELECTIVE DEHALOGENATION OF 6 ALPHA-FLUORO-9 ALPHA-HALO 11 BETA-HYDROXY STEROIDS

[75] Inventors: Henry Laurent; Rudolf Wiechert, both of Berlin, Germany

[73] Assignee: Schering Aktiengesellschaft, Berlin, Germany

[22] Filed: Apr. 8, 1974

[21] Appl. No.: 459,098

[30] Foreign Application Priority Data
Apr. 19, 1973   Germany............................ 2320999

[52] U.S. Cl. ........................................... 260/397.45
[51] Int. Cl.² ........................................ C07c 169/32

[58] Field of Search .............................. 260/397.45

[56] References Cited
OTHER PUBLICATIONS
Baston et al., J. Amer. Chem. Soc., 88, 1966, page 3016.

*Primary Examiner*—Elbert L. Roberts
*Attorney, Agent, or Firm*—Millen, Raptes & White

[57] ABSTRACT

6$\alpha$-Fluoro-9$\alpha$-(Cl, Br and I)-11$\beta$-hydroxy-$\Delta^4$-3-keto and $\Delta^{1,4}$-3-keto steroids are selectively dehalogenated at the 9-position with trialkyltin hydride, preferably in the presence of free radicals.

8 Claims, No Drawings

SELECTIVE DEHALOGENATION OF 6 ALPHA-FLUORO-9 ALPHA-HALO 11 BETA-HYDROXY STEROIDS

BACKGROUND OF THE INVENTION

This invention relates to a process for the selective dehalogenation of 6α-fluoro-9α-halo-11β-hydroxy-3-keto-$\Delta^4$-and $\Delta^{1,4}$-steroids.

It is known that 9α-bromo-11β-hydroxy-4-pregnene-3,20-dione can be debrominated with triphenyltin hydride (Barton et al., J. Amer. Chem. Soc. 88, 1966, 3016). If this reaction is conducted on a steroid having a 6α-fluorine atom, the 6-fluorine atom is also substituted by hydrogen along with the halogen atom in the 9-position, as illustrated hereinafter. (See Example A.)

It is an object of the present invention to provide a process for selectively eliminating the halogen atom in the 9-position of a 6α-fluoro-9α-(chloro-, bromo-, or iodo)-11β-hydroxy-$\Delta^4$-3-keto and $\Delta^{1,4}$-keto steroids without attacking the fluorine atom in the 6-position.

SUMMARY OF THE INVENTION

According to the process of this invention, the 9-halogen of 6α-fluoro-9α-(chloro-, bromo-, or iodo)-11β-hydroxy-3-keto-$\Delta^4$- and $\Delta^{1,4}$-steroids is selectively dehalogenated with a trialkyltin hydride, preferably in the presence of a free radical-forming agent.

The steroid reaction products of the process of this invention can be represented by the general partial Formula I

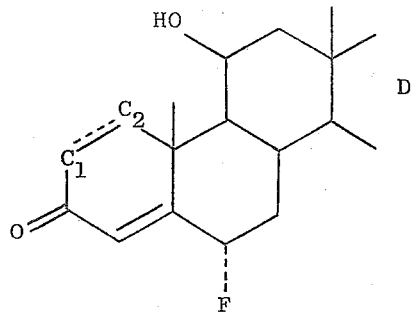

I wherein $C_1\text{---}C_2$ represents the $C_1$ and $C_2$-position carbon atoms joined by a single or double carbon-to-carbon bond and D represents the D-ring of the steroid molecule substituted in the usual manner. These 9α-hydrogen steroids are produced by treating 6α-fluoro-9α-(chloro-, bromo- or iodo-)-11β-hydroxy-$\Delta^4$- and $\Delta^{1,4}$-3-keto-steroids, which steroids can be represented by the general partial Formula II

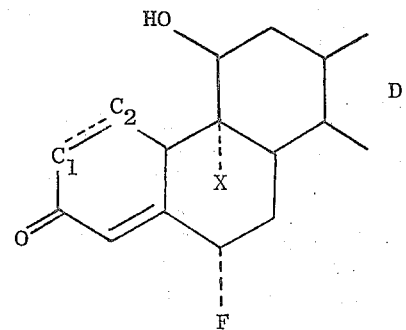

II wherein X is chlorine, bromine or iodine and $C_1\text{---}C_2$ and D have the values given above, with a trialkyltin hydride, preferably in the presence of a free radical-forming agent.

DETAILED DISCUSSION

It was surprising that, by using trialkyltin hydride, the chlorine, bromine or iodine atom in the 9α-position is selectively eliminated and the fluorine atom in the 6α-position is not affected. Analogously to the reaction with triphenyltin hydride, it would be expected the fluorine atom would also be split off, especially since the latter is activated in its reactivity by its allyl position relative to the $\Delta^4$-double bond.

The operability and utility of the process is not dependent upon the exact nature of the substituents on the D-ring. Thus, the D-ring of the starting steroids (and of the products) of the process of this invention can be substituted in the usual manner, preferably in the 17-position. Examples of such substituents are, for the androstane series, 17-keto, 17β-hydroxy, 17β-acyloxy, 17β-ethyl, and for the pregnane series, 17β-acetyl, 17β-hydroxyacetyl, 17β-acyloxyacetyl, 17α-hydroxy-17β-acetyl, 17α-acyloxy-17β-acetyl, 17α-hydroxy-17β-hydroxyacetyl, 17α-hydroxy-17β-acyloxyacetyl, 17α-acyloxy-17β-acyloxyacetyl and 17β-(2-hydroxypropionyl). The 16-position can also be substituted, e.g., by hydroxy or lower alkyl. Hydroxy groups in the 16- and 17- or in the 17- and 21-positions can be present in free, etherified or esterified form or part of a dialkylmethylenedioxy, cycloalkylidenedioxy, or arylalkylmethylenedioxy group. A 20-keto group, when present, can also be in the masked (blocked) form, for example, as ethylene ketal or as the bis(alkylidenedioxy) compound in case of the hydrocortisone side chain.

Preferred starting steroids for the process of this invention are steroids of the pregnane series of the general Formula III

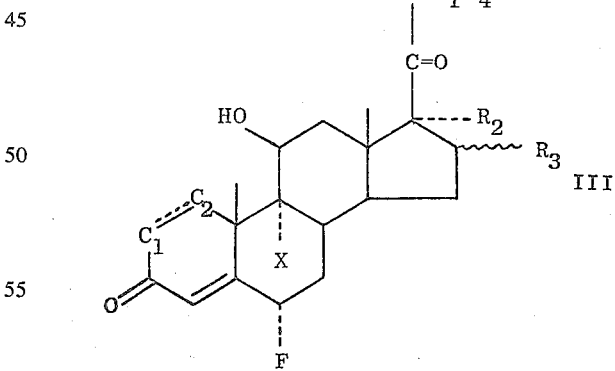

III wherein $R_1$ is hydrogen, hydroxy or acyloxy, $R_2$ is hydrogen, hydroxy or acyloxy and $R_3$ is hydrogen, methyl, hydroxy or acyloxy, especially those wherein acyl in each instance is the acyl radical of a hydrocarbon carboxylic acid of 2–12 carbon atoms, or $R_2$ and $R_3$ collectively are dialkylmethylenedioxy, especially those wherein alkyl is of 1 to 4 carbon atoms, $R_4$ is hydrogen or methyl, and $C_1$---$C_2$ and X have the values given above.

Since the exact nature of the substituents on the D-ring is not critical to the operability or utility of the process of this invention, obviously if such a substituent is or bears an acyloxy group, the exact nature of the acyloxy group is not critical.

Thus, the acyl and acyloxy groups can be those of any carboxylic acid customarily employed in the steroid chemistry for esterification reactions. Preferred acids are those of up to 15 carbon atoms, especially lower and intermediate hydrocarbon carboxylic acids of 2–12 carbon atoms. However, the acids can also be unsaturated, branched, polybasic, unsubstituted or substituted in the usual manner, for example by a hydroxy group, an amino group, or one or more halogen atoms. Suitable are also cycloalkanoic, hydrocarbonaryl, mixed hydrocarbonaryl-alkanoic, cycloalkylalkanoic and heterocyclic carboxylic acids which can likewise be substituted in the usual manner with 1, 2 or 3 simple substituents. Preferred acids for forming the acyloxy residues $R_1$, $R_2$ and/or $R_3$ are, for example, alkanoic acids, e.g., acetic acid, propionic acid, valeric acid, caproic acid, enanthic acid, undecylic acid, oleic acid, trimethylacetic acid, haloacetic acids, e.g., trichloroacetic acid, cycloalkylcarboxylic and cycloalkylalkanoic acids, e.g., cyclopentylpropionic acid, arylalkanoic acids, e.g., phenylpropionic acid, phenylacetic acid, and substituted alkanoic acids, e.g., phenoxyacetic acid, dialkylaminoacetic acid, piperidinoacetic acid, succinic acid, benzoic acid, etc.

Because of their known usefulness in steroid pharmaceutical chemistry, the preferred reaction products of the present invention are accordingly 9α-H-steroids of the general Formula III, wherein X is H.

The process of this invention is suitably conducted by adding the trialkyltin hydride to a solution of the starting steroid dissolved in a suitable inert solvent.

Examples of suitable trialkyltin hydrides are those wherein alkyl is of 1 - 10, preferably 1 - 6 carbon atoms, e.g., trimethyltin hydride, triethyltin hydride, and tributyltin hydride, the latter being preferred since it can be handled relatively easily.

At least the latter portion of the reaction is preferably conducted in the presence of a free radical. However, the reaction of this invention can also be accomplished in the absence of a free radical-forming agent, although longer reaction times sometimes are necessary. Examples of suitable free radical-forming agents are azodiisobutyronitrile, di-tert.-butyl peroxide and UV irradiation.

The process of this invention can also be conducted, if desired, by forming the trialkyltin hydride in situ during the reaction. For this purpose, the corresponding trialkyltin oxide and polymethylsiloxane are added to a solution of the starting steroid. The advantage of this modification of the process is that easily decomposed trialkyltin hydrides need not be isolated in an initial step.

Suitable solvents for the process of this invention are those which are inert with regard to the reactants. Examples are the ethers, such as diethyl ether or glycol ether, cyclic ethers, such as tetrahydrofuran or dioxane and hydrocarbons, such as hexane or benzene. Also suitable are alcohols, such as ethanol or glycol and nitriles, such as acetonitrile.

The process of this invention is preferably effected at an elevated temperature, i.e., from above room temperature to the boiling point of the reaction mixture, e.g., from about 20° to 100°C. However, the reaction also occurs below room temperature, but the reaction times in some cases become very long.

The compounds producible in accordance with this invention are either themselves valuable pharmaceuticals, such as, for example antiphlogistics, or they are intermediates for the preparation of such pharmaceuticals.

The following illustrates the effect of triphenyltin hydride on the 6α-fluoro atom.

EXAMPLE A 2.3 g. of 6α-fluoro-9α-bromo-11β-hydroxy-21-valeryloxy-16α-methyl-1,4-pregnadiene-3,20-dione (produced conventionally from 6α-fluoro-21-valeryloxy-16α-methyl-1,4,9(11)-pregnatriene-3,20-dione by treatment with N-bromosuccinimide in aqueous dioxane) is dissolved in 46 ml. of tetrahydrofuran and combined with 14.5 ml. of triphenyltin hydride and 50 50mg. of azodiisobutyronitrile. After heating for 20 minutes to 80° C., the reaction mixture is concentrated under vacuum and the residue is chromatographed on silica gel. With 21–26% acetone-hexane, and after recrystallization from acetone-hexane, the product was 1.20 g. of 11β-hydroxy-21-valeryloxy-16α-methyl-1,4-pregnadiene-3,20-dione, m.p. 152.5° – 153.0° C. $[\alpha]_D^{25}$ = +120° (chloroform); UV: $\epsilon_{243}$ = 14,800 (methanol).

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1 a. 2.0 g. of 6α-fluoro-21-valeryloxy-16α-methyl-1,4,9(11)-pregnatriene-3,20-dione is dissolved in 80 ml. of dioxane and 20 ml. of water and combined with 2.0 g. of N-bromosuccinimide as well as 2.0 ml. of 70% strength perchloric acid. The reaction mixture is agitated for 3 hours at room temperature and then precipitated with water which contains sodium sulfite. The thus-produced precipitate is vacuum-filtered and dissolved in methylene chloride. The solution is washed with water, dried over sodium sulfate, and evaporated under vacuum, thus obtaining 2.4 g. of 6α-fluoro-9α-bromo-11β-hydroxy-21-valeryloxy-16α-methyl-1,4-pregnadiene-3,20-dione as a crude product.

b. 2.4 g. of the thus-obtained product is dissolved in 48 ml. of tetrahydrofuran and mixed with 17 ml. of tributyltin hydride. The mixture is heated to 80° C. and, after 2 hours of reaction, 10 mg. of azodiisobutyronitrile is added thereto. After another hour, the reaction is terminated. The solution is evaporated under vacuum and the residue crystallized with hexane. The crystalline product is filtered off and recrystallized from acetone/hexane. Yield: 1.83 g. of 6α-fluoro-11β-hydroxy-21-valeryloxy-16α-methyl-1,4-pregnadiene-3,20-dione, m.p. 201.6° C. $[\alpha]_D^{25}$ = + 114° (chloroform); UV: $\epsilon_{242}$ = 16,000 (methanol).

EXAMPLE 2 a. 1.5 g. of 6α-fluoro-21-trimethylacetoxy-16α- methyl-1,4,9(11)-pregnatriene-3,20-dione is converted into the bromohydrin under the conditions described in Example 1(a). Yield: 1.7 g. of 6α-fluoro-9α-bromo-11β-hydroxy-21-trimethylacetoxy-16α-methyl-1,4-pregnadiene-3,20-dione as the crude product.

b. 1.7 g. of the thus-obtained product is dissolved in 37.5 ml. of tetrahydrofuran. The solution is mixed with 3.75 ml. of tributyltin hydride and 0.05 ml. of di-tert.-butyl peroxide and heated to the boiling point for 30 minutes. The reaction mixture is then evaporated under vacuum and the residue triturated with hexane. The crystalline slurry is vacuum-filtered and recrystallized from acetone/hexane. Yield: 1.32 g. of 6α-fluoro-11β-hydroxy-21-trimethylacetoxy-16α-methyl-1,4-pregnadiene-3,20-dione, m.p. 169.5° C. $[\alpha]_D^{25} = +103°$ (chloroform); UV: $\epsilon_{241} = 15,200$ (methanol).

EXAMPLE 3

2.2 g. of 6α-fluoro-9α-chloro-11β-hydroxy-16α-methyl-1,4-pregnadiene-3,20-dione (U.S. Pat. No. 3,426,128) is dissolved in 40 ml. of tetrahydrofuran; the solution is heated to the boiling point for 3 hours after combining with 10 ml. of tributyltin hydride and 50 mg. of azodiisobutyronitrile. The reaction mixture is evaporated under vacuum and the residue triturated with hexane. The crystalline product is isolated and recrystallized from acetone/hexane. Yield: 1.73 g. of 6α-fluoro-11β-hydroxy-21-hexanoyloxy-16α-methyl-1,4-pregnadiene-3,20-dione, m.p. 243.2°C. $[\alpha]_D^{25} = +118°$ (chloroform); UV: $\epsilon_{240} = 15,100$ (methanol).

EXAMPLE 4

2.41 g. of 6α-fluoro-9α-bromo-11β-hydroxy-21-acetoxy-16α-methyl-1,4-pregnadiene-3,20-dione (DAS 1,211,194) is dissolved in 48 ml. of tetrahydrofuran. The solution is heated for 5 hours to the boiling point after adding 4.8 ml. of tributyltin hydride. After the solvent has been evaporated, the residue is treated with hexane, the crystalline product is isolated and recrystallized from acetone/hexane. Yield: 1.69 g. of 6α-fluoro-11β-hydroxy-21-acetoxy-16α-methyl-1,4-pregnadiene-3,20-dione, m.p. 230.3° C. $[\alpha]_D^{25} = +117°$ (chloroform); UV: $\epsilon_{240} = 15,800$ (methanol).

EXAMPLE 5

2.5 g. of 6α-fluoro-9α-bromo-11β-hydroxy-21-acetoxy-16α-methyl-4-pregnene-3,20-dione (DAS 1,211,194) is dissolved in 50 ml. of tetrahydrofuran and combined with 10 ml. of tributyltin hydride as well as 50 mg. of azodiisobutyronitrile. The mixture is heated for 30 minutes to the boiling point, the solution is concentrated under vacuum, and the residue is triturated with hexane. The crystalline product is isolated and recrystallized from acetone/hexane. Yield: 1.93 g. of 6α-fluoro-11β-hydroxy-21-acetoxy-16α-methyl-4-pregnene-3,20-dione, m.p. 259.7° C. $[\alpha]_D^{25} = +168°$ (chloroform); UV: $\epsilon_{236} = 14,700$ (methanol).

EXAMPLE 6

750 mg. of 6α-fluoro-9α-bromo-11β,17α-dihydroxy-21-acetoxy-16α-methyl-1,4-pregnadiene-3,20-dione (JACS 82, 2318 [60]) is reacted with tributyltin hydride under the conditions described in Example 5. The crude product is recrystallized from acetone/hexane. Yield: 478 mg. of 6α-fluoro-11β,17α-dihydroxy-21-acetoxy-16α-methyl-1,4-pregnadiene-3,20-dione, m.p. 241.3° C. $[\alpha]_D^{25} = +74°$ (chloroform); UV: $\epsilon_{242} = 15,800$ (methanol).

EXAMPLE 7

950 mg. of 6α-fluoro-9α-bromo-11β,17α-dihydroxy-21-acetoxy-1,4-pregnadiene-3,20-dione (DAS 1,090,661) is reduced with tributyltin hydride under the conditions disclosed in Example 5. The crude product is recrystallized from acetone/hexane. Yield: 655 mg. of 6α-fluoro-11β,17α-dihydroxy-21-acetoxy-1,4-pregnadiene-3,20-dione, m.p. 241.0° C. $[\alpha]_D^{25} = +110°$ (dioxane) UV: $\epsilon_{242} = 17,000$ (methanol).

EXAMPLE 8

500 mg. of 6α-fluoro-9α-bromo-11β-hydroxy-16α,17α-isopropylidenedioxy-21-acetoxy-1,4-pregnadiene-3,20-dione (Steroids 7, 381 [66]) is reacted with tributyltin hydride under the conditions set forth in Example 5. The crude product is recrystallized from acetone/hexane. Yield: 338 mg. of 6α-fluoro-11β-hydroxy-16α,17α-isopropylidenedioxy-21-acetoxy-1,4-pregnadiene-3,20-dione, m.p. 271.0° C. $[\alpha]_D^{25} = +89°$ (chloroform); UV: $\epsilon_{242} = 16,100$ (methanol).

EXAMPLE 9

350 mg. of 6α-fluoro-9α-bromo-11β-hydroxy-17α,21-diacetoxy-4-pregnene-3,20-dione (JACS 82, 3399 [60]) is reduced with tributyltin hydride in accordance with the conditions described in Example 5. After recrystallization of the crude product from methylene chloride/diisopropyl ether, the yield is 120 mg. of 6α-fluoro-11β-hydroxy-17α,21-diacetoxy-4-pregnene-3,20-dione, m.p. 231.1° C.

EXAMPLE 10

150 mg. of 6α-fluoro-9α-bromo-11β,17α-dihydroxy-21-acetoxy-21-methyl-1,4-pregnadiene-3,20-dione (U.S. Pat. No. 3,047,594) is reduced with tributyltin hydride under the conditions disclosed in Example 5. The crude product, after recrystallization from acetone/hexane, yields 79 mg. of 6α-fluoro-11β,17α-dihydroxy-21-acetoxy-21-methyl-1,4-pregnadiene-3,20-dione, m.p. 223.0° C.

EXAMPLE 11

200 mg. of 6α-fluoro-9α-bromo-11β,17α-dihydroxy-21-acetoxy-16β-methyl-1,4-pregnadiene-3,20-dione (German Patent 1,443,176) is converted into 6α-fluoro-11β,17α-dihydroxy-21-acetoxy-16β-methyl-1,4-pregnadiene-3,20-dione under the conditions indicated in Example 5. Yield: 113 mg., m.p. 215.5° C.

EXAMPLE 12

500 mg. of 6α-fluoro-9α-bromo-11β,17α-dihydroxy-1,4-pregnadiene-3,20-dione (U.S. Pat. No. 2,838,542) is reduced with tributyltin hydride in accordance with the conditions set forth in Example 5. Recrystallization from hexane/acetone yields 248 mg. of 6α-fluoro-11β,17α-dihydroxy-1,4-pregnadiene-3,20-dione, m.p. 268.3° C.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the selective dehalogenation of the 9-halogen atom of 6α-fluoro-9α-halo-11β-hydroxy-$\Delta^4$- and $\Delta^{1,4}$-3-keto steroids wherein halo is Cl, Br or I, which comprises dehalogenating with a trialkyltin hydride.

2. A process according to claim 1 wherein the trialkyltin hydride is tributyltin hydride.

3. A process according to claim 1 wherein at least the latter portion of the reaction is conducted in the presence of a free radical.

4. A process according to claim 3 wherein the reaction is conducted in the presence of di-tert.-butyl peroxide or azodiisobutyronitrile.

5. A process according to claim 1 wherein the reaction is conducted at a temperature from above room temperature to the boiling point of the reaction mixture.

6. A process according to claim 5 wherein the trialkyltin hydride is tributyltin hydride and at least the latter portion of the reaction is conducted in the presence of free radicals and the 9-halogen atom is bromine.

7. A process according to claim 1 wherein the starting steroid is a compound of the formula

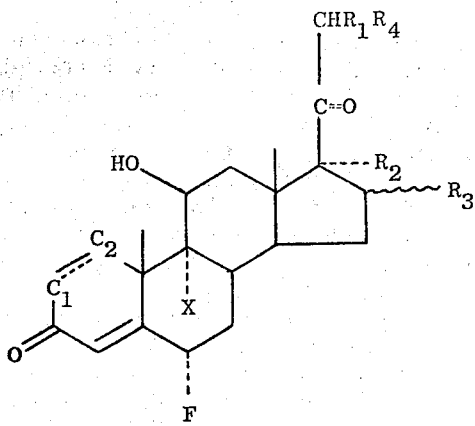

wherein $R_1$ is hydrogen, hydroxy or acyloxy, $R_2$ is hydrogen, hydroxy or acyloxy and $R_3$ is hydrogen, methyl, hydroxy or acyloxy, acyloxy in each instance being the acyl radical of a hydrocarbon carboxylic acid of 2–12 carbon atoms, or $R_2$ and $R_3$ collectively are dialkylmethylenedioxy wherein alkyl is of 1 – 4 carbon atoms, $R_4$ is hydrogen or methyl, X is cl, Br or I, and $C_1$----$C_2$ are the $C_1$ and $C_2$-position carbon atoms joined by a single or double carbon-to-carbon bond.

8. A process according to claim 7 wherein the trialkyltin hydride is tributyltin hydride and at least the latter portion of the reaction is conducted in the presence of free radicals and the 9-halogen atom is bromine.

* * * * *

UNITED STATES PATENT OFFICE
CERTIFICATE OF CORRECTION

PATENT NO. : 3,894,063
DATED : July 8, 1975
INVENTOR(S) : HENRY LAURENT and RUDOLF WIECHERT It is certified that error appears in the above-identified patent and that said Letters Patent are hereby corrected as shown below:

Claim 7 (column 8, line 24), delete "cl" and insert --Cl--.

Signed and Sealed this eighteenth Day of November 1975

[SEAL]

Attest:

RUTH C. MASON
Attesting Officer

C. MARSHALL DANN
Commissioner of Patents and Trademarks